United States Patent
Shibutani (12)

(10) Patent No.: US 8,989,603 B2
(45) Date of Patent: Mar. 24, 2015

(54) COHERENT OPTICAL RECEIVER AND COHERENT OPTICAL RECEIVING METHOD

(71) Applicant: NEC Corporation, Minato-ku, Tokyo (JP)

(72) Inventor: Makoto Shibutani, Tokyo (JP)

(73) Assignee: NEC Corporation, Tokyo (JP)

( * ) Notice: Subject to any disclaimer, the term of this patent is extended or adjusted under 35 U.S.C. 154(b) by 197 days.

(21) Appl. No.: 13/644,813

(22) Filed: Oct. 4, 2012

(65) Prior Publication Data

US 2013/0084080 A1    Apr. 4, 2013

(30) Foreign Application Priority Data

Oct. 4, 2011  (JP) .................................. 2011-219886

(51) Int. Cl.
*H04B 10/06* (2006.01)
*H04B 10/61* (2013.01)

(52) U.S. Cl.
CPC .................................. *H04B 10/6161* (2013.01)
USPC ........................... 398/208; 398/203; 398/204

(58) Field of Classification Search
CPC .... H04B 10/61; H04B 10/63; H04B 10/6161; H04B 10/6163

USPC .......................................... 398/202–204, 208
See application file for complete search history.

(56) References Cited

U.S. PATENT DOCUMENTS

| 2008/0069571 | A1* | 3/2008 | Honda .......................... 398/147 |
| 2010/0196017 | A1* | 8/2010 | Tanimura et al. ............. 398/159 |
| 2013/0148967 | A1* | 6/2013 | Tanimura et al. ............. 398/65 |

FOREIGN PATENT DOCUMENTS

| JP | 2010-178222 A | 8/2010 |
| JP | 2011/009956 A | 1/2011 |
| JP | 2011/15013 A | 1/2011 |

* cited by examiner

*Primary Examiner* — Dzung Tran
(74) *Attorney, Agent, or Firm* — Sughrue Mion, PLLC

(57) ABSTRACT

A coherent optical receiver according to an exemplary aspect of the present invention includes a coherent optical receiving unit, a first waveform equalizing circuit compensating waveform distortion caused by characteristics of the coherent optical receiving unit and compensating chromatic dispersion in a predetermined range to an input signal, a second waveform equalizing circuit compensating chromatic dispersion of the input signal, and a controller monitoring a chromatic dispersion amount of the input signal and controlling a compensation coefficient regarding the chromatic dispersion compensation performed by each of the first waveform equalizing circuit and the second waveform equalizing circuit depending on the chromatic dispersion amount to be compensated.

10 Claims, 5 Drawing Sheets

COHERENT OPTICAL RECEIVER AND COHERENT OPTICAL RECEIVING METHOD

This application is based upon and claims the benefit of priority from Japanese Patent Application No. 2011-219886, filed on Oct. 4, 2011, the disclosure of which is incorporated herein in its entirety by reference.

TECHNICAL FIELD

The present invention relates to a coherent optical receiver and a coherent optical receiving method and, in particular, to a coherent optical receiver and a coherent optical receiving method which perform waveform equalization processing using an electric equalizing filter.

BACKGROUND ART

In recent years, a coherent optical receiving system is spotlighted for realizing high-speed, large-capacity, and long-haul Wavelength Division Multiplexing (WDM) optical transmission systems. The coherent optical receiving system performs waveform equalization processing such as chromatic dispersion compensation by the digital signal processing after performing coherent reception of a light signal which transmitted in an optical fiber and converting into an electric signal. In other words, the coherent optical receiving system can compensate waveform distortion of a signal caused by chromatic dispersion or the like, which becomes a major problem in case of long-haul transmission in the optical fiber, with a high degree of accuracy using an electric equalizing filter. For this reason, the coherent optical receiving system does not require optical components for chromatic dispersion compensation such as DCF (Dispersion Compensating Fiber) and TDC (Tunable Dispersion Compensator). The point that such expensive optical components are not needed and a substantial cost reduction can be achieved becomes one of major advantages of the coherent optical receiving system.

An example of an optical receiver to which such coherent optical receiving system has been applied is disclosed in Japanese Patent Application Laid-Open Publication No. 2010-178222. The Japanese Patent Application Laid-Open Publication No. 2010-178222 discloses a distortion compensation apparatus which can reduce a hardware size of the distortion compensation apparatus and an optical receiver which includes that. This related distortion compensation apparatus includes a plurality of regulated amount compensation units in which a compensation amount is fixed and a variable compensation unit in which a compensation amount is variable, and compensates waveform distortion of a received light signal by the digital signal processing. The regulated amount compensation unit is configured so that it can change the combination of compensating operation by on/off switching. And, depending on the waveform distortion which arises in an optical transmission path, a controller first compensates the waveform distortion by the fixed compensation amount which can be compensated by a combination of the regulated amount compensation units, and then variably controls the compensation amount of the variable compensation unit based on the remaining waveform distortion.

Japanese Patent Application Laid-Open Publication No. 2011-009956 discloses the technology which solves the degradation of communication quality due to a frequency drift of a local oscillation light in the digital coherent receiving. If a frequency of the local oscillation light fluctuates, a light signal cannot be demodulated in digital domain with high accuracy. As a result, the communication quality degrades. According to the Japanese Patent Application Laid-Open Publication No. 2011-009956, a waveform distortion compensating circuit compensates waveform distortion of a signal converted into a digital signal, and a phase detecting unit detects a phase of the signal for which the waveform distortion has been compensated. And, a phase compensator compensates the phase of the signal for which the waveform distortion has been compensated by the waveform distortion compensating circuit based on the phase detected by the phase detecting unit, and demodulates the signal for which the phase has been compensated.

Japanese Patent Application Laid-Open Publication No. 2011-015013 discloses the technology which appropriately performs the dispersion compensation in a digital coherent optical receiver. In the technology disclosed in the Japanese Patent Application Laid-Open Publication No. 2011-015013, a first compensating circuit compensates the waveform distortion corresponding to chromatic dispersion by the digital signal processing. And, a chromatic dispersion compensation control circuit controls the compensation amount of the chromatic dispersion in the first compensating circuit based on a detection output value of a phase shift between a sampling signal in the digital conversion and a modulation frequency of a received light signal.

SUMMARY

An exemplary object of the present invention is to provide a coherent optical receiver and a coherent optical receiving method which can perform chromatic dispersion compensation flexibly by using a small circuit size even in an environment where the chromatic dispersion amount to be compensated is greatly different.

A coherent optical receiver according to an exemplary aspect of the present invention includes a coherent optical receiving unit, a first waveform equalizing circuit compensating waveform distortion caused by characteristics of the coherent optical receiving unit and compensating chromatic dispersion in a predetermined range to an input signal, a second waveform equalizing circuit compensating chromatic dispersion of the input signal, and a controller monitoring a chromatic dispersion amount of the input signal and controlling a compensation coefficient regarding the chromatic dispersion compensation performed by each of the first waveform equalizing circuit and the second waveform equalizing circuit depending on the chromatic dispersion amount to be compensated.

A coherent optical receiving method according to an exemplary aspect of the invention includes the steps of compensating waveform distortion caused by coherent optical receiving and compensating chromatic dispersion in a predetermined range to an input signal, performing chromatic dispersion compensation to the input signal, and monitoring a chromatic dispersion amount of the input signal, and controlling a compensation coefficient regarding each of the chromatic dispersion compensation in a predetermined range and the chromatic dispersion compensation to the input signal depending on the chromatic dispersion amount to be compensated.

BRIEF DESCRIPTION OF THE DRAWINGS

Exemplary features and advantages of the present invention will become apparent from the following detailed description when taken with the accompanying drawings in which.

EXEMPLARY EMBODIMENT

The exemplary embodiments according to the present invention will be described with reference to drawings.

As a matter of course, the embodiment is exemplification and the present invention is not limited to the configurations of the following exemplary embodiments.

Figure 1:
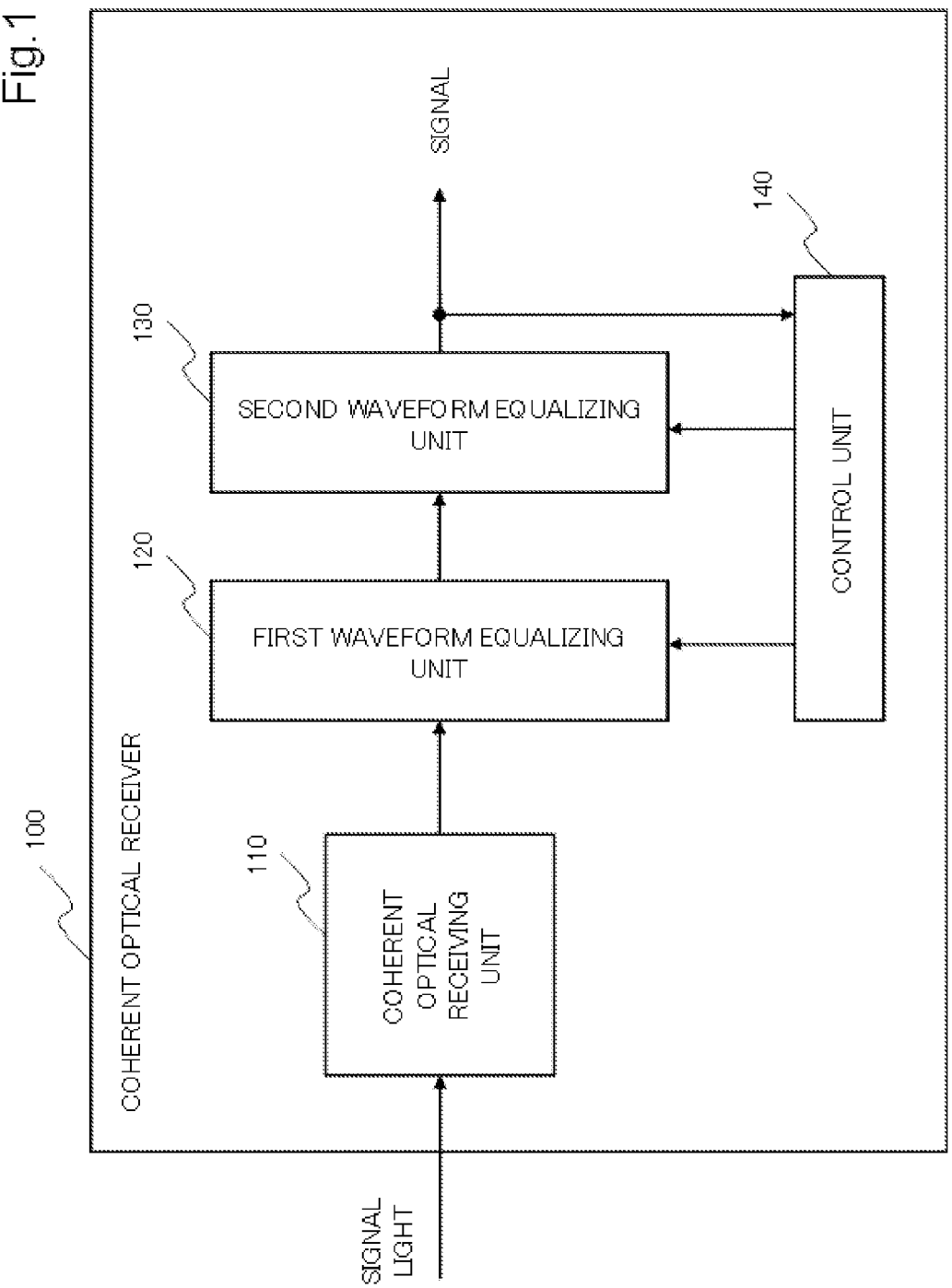
FIG. 1 is a block diagram showing a configuration of a coherent optical receiver according to the first exemplary embodiment of the present invention.

FIG. 1 is a block diagram showing the configuration of a coherent optical receiver according to the first exemplary embodiment of the present invention.

The coherent optical receiver 100 according to the first exemplary embodiment of the present invention includes a coherent optical receiving unit 110, a first waveform equalizing unit 120, a second waveform equalizing unit 130, and a control unit 140.

The first waveform equalizing unit 120 inputs a digital electric signal outputted from the coherent optical receiving unit 110, performs compensation of waveform distortion due to the characteristics of the coherent optical receiving unit 120, and performs chromatic dispersion compensation in the predetermined range.

The coherent optical receiving unit 110 receives an inputted signal light by coherent optical reception, converts it into a digital electric signal, and outputs the digital electric signal. The output signal contains waveform distortion caused by peculiar characteristics of the coherent optical receiving unit 110. For example, the coherent optical receiving unit 110 separates a signal light into X polarization and Y polarization and further detects respective in-phase components and quadrature components, therefore, it detects four kinds of time waveforms. A skew arises which is a mutual time delay occurring in the detection process of these four kinds of time waveforms. Also, there remain level differences which could not be absorbed in the gain adjustment performed in conversion into a digital electric signal.

The first waveform equalizing unit 120 performs chromatic dispersion compensation in the predetermined range in addition to the compensation of such waveform distortion caused by the characteristics of coherent optical receiving unit 110.

The second waveform equalizing unit 130 performs chromatic dispersion compensation in an input signal.

The control unit 140 monitors a chromatic dispersion amount of the input signal and controls compensation coefficients regarding the chromatic dispersion compensation which is performed by each of the first waveform equalizing circuit and the second waveform equalizing circuit depending on the chromatic dispersion amount to be compensated.

Here, these compensation coefficients are filter coefficients used for waveform equalization in an equalizing filter provided with each of the first waveform equalizing unit and the second waveform equalizing unit.

Next, the operation of this first exemplary embodiment will be described with reference to FIG. 2.

Figure 2:
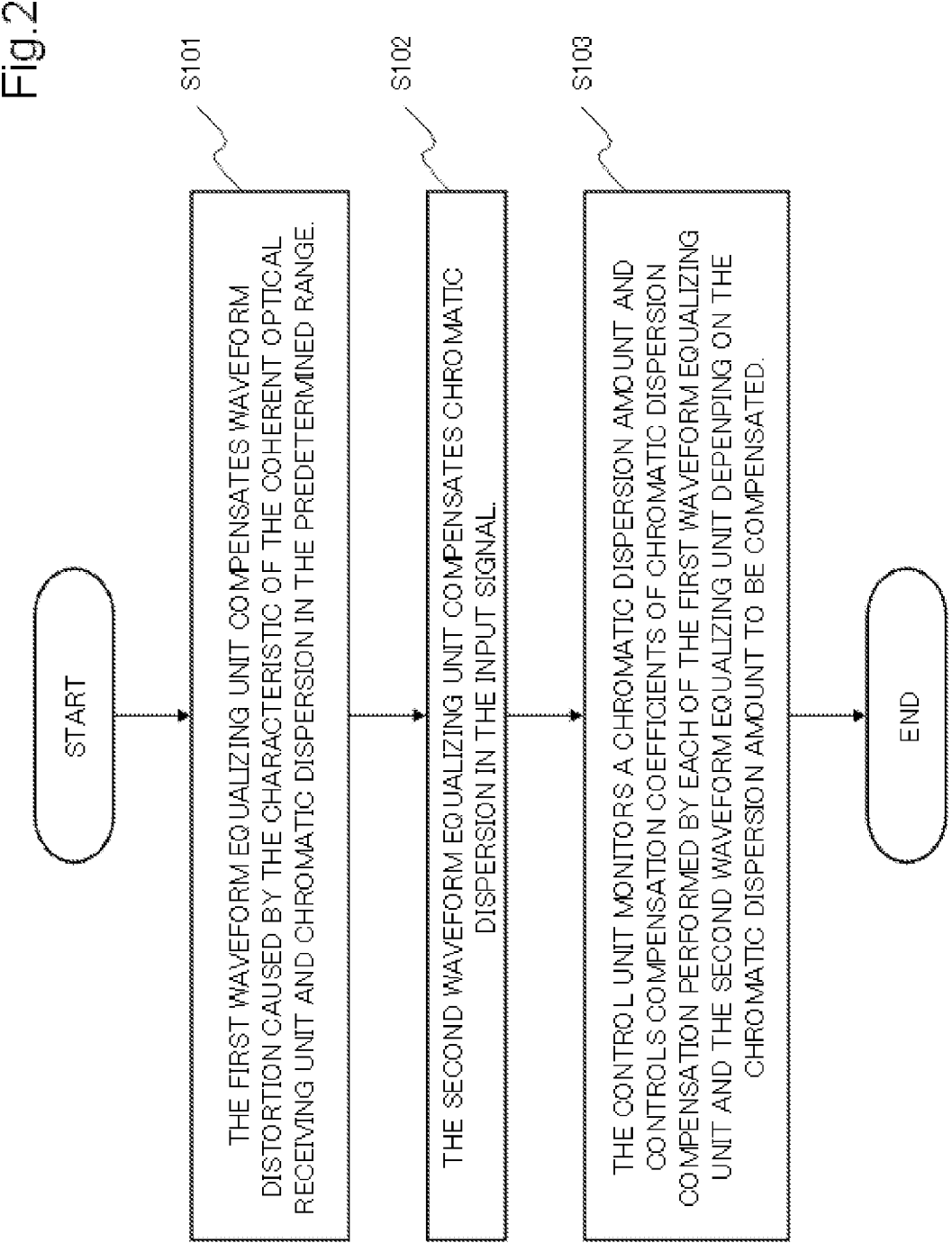
FIG. 2 is a flowchart illustrating the operation of the coherent optical receiver according to the first exemplary embodiment of the present invention.

FIG. 2 is a flowchart illustrating the operation of the coherent optical receiver according to the first exemplary embodiment. The coherent optical receiver according to the first exemplary embodiment operates as follows.

The first waveform equalizing unit compensates the waveform distortion of an input signal caused by the characteristics of the coherent optical receiving unit and compensates the chromatic dispersion in the predetermined range (S101).

The second waveform equalizing unit compensates the chromatic dispersion in the input signal (S102).

The control unit monitors a chromatic dispersion amount of the input signal and controls compensation coefficients regarding the chromatic dispersion compensation performed by each of the first waveform equalizing unit and the second waveform equalizing unit depending on the chromatic dispersion amount to be compensated (S103).

As mentioned above, the coherent optical receiver 100 of the first exemplary embodiment uses the first waveform equalizing unit 120 and the second waveform equalizing unit 130, both of which are waveform equalizing units using an electric equalizing filter.

It is found from above description that both of the first waveform equalizing unit 120 and the second waveform equalizing unit 130 are waveform equalizing units which handle a variable compensation amount. Moreover, the first waveform equalizing unit 120 is configured to perform the chromatic dispersion compensation in the predetermined range in addition to the compensation of waveform distortion caused by the characteristics of the coherent optical receiving unit. And, the compensation coefficients regarding the chromatic dispersion compensation performed by each of the first waveform equalizing unit 120 and the second waveform equalizing unit 130 are controlled depending on the chromatic dispersion amount to be compensated.

Therefore, the chromatic dispersion compensation can be flexibly performed even in the environment where the chromatic dispersion amount to be compensated is greatly different. In other words, the chromatic dispersion compensation can be flexibly performed in such a manner as each of the compensation handled only by the first waveform equalizing unit, the compensation handled only by the second waveform equalizing unit, and the compensation handled by both of the first waveform equalizing unit and the second waveform equalizing unit.

Furthermore, since the first waveform equalizing unit shares in the chromatic dispersion compensation in the predetermined range, the second waveform equalizing unit 130 can be realized by a smaller circuit size by sharing. Moreover, since the first waveform equalizing unit 120 is originally provided in order to compensate the waveform distortion caused by the characteristics of the coherent optical receiving unit, it does not need to set up it additionally as a new hardware.

Next, a coherent optical receiver of a second exemplary embodiment of the present invention will be described.

Figure 3:
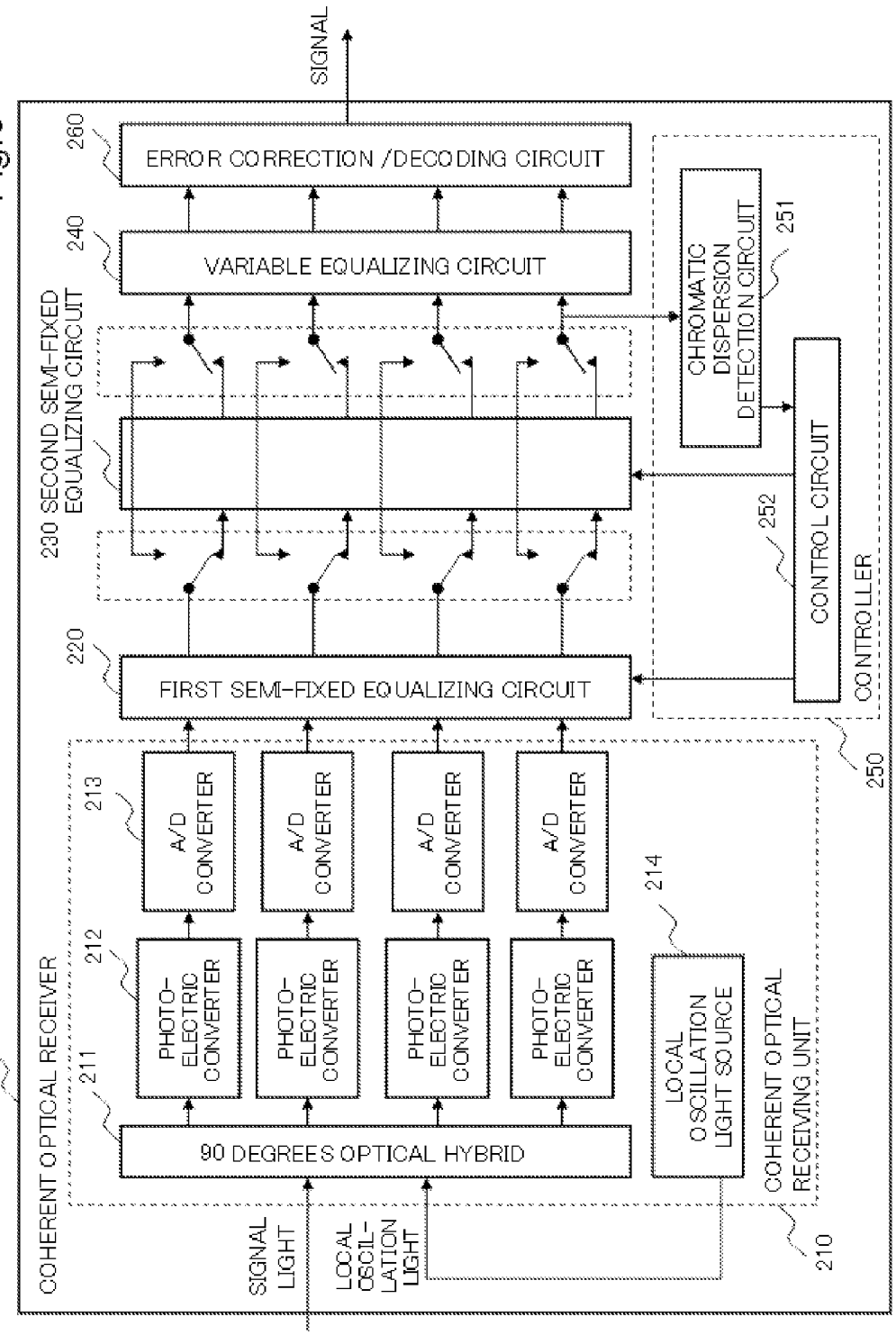
FIG. 3 is a block diagram showing a configuration of a coherent optical receiver according to the second exemplary embodiment of the present invention.

FIG. 3 is a block diagram showing the configuration of the coherent optical receiver according to the second exemplary embodiment of the present invention.

The coherent optical receiver 200 according to the second exemplary embodiment is configured by including a coherent optical receiving unit 210, a first semi-fixed equalizing circuit 220, a second semi-fixed equalizing circuit 230, a variable equalizing circuit 240, a controller 250, and an error correction/decoding circuit 260.

In FIG. 3, the signal light inputted into the coherent optical receiver 200 is received by coherent light reception in the coherent optical receiving unit 210, and conversion to an electric signal and further conversion to a digital signal are performed. That is to say, the signal light is inputted into a 90 degrees optical hybrid 211 along with the local oscillation light outputted from a local oscillation light source 214, separated into X polarization and Y polarization, and then outputted as the four mixed light including respective in-phase components and quadrature phase components. Each mixed light is outputted from the coherent optical receiving unit 210 as a digital electric signal through a photoelectric converter 212 and an A/D (analog to digital) converter 213.

The digital signal outputted from the coherent optical receiving unit 210 is inputted into the first semi-fixed equalizing circuit 220, the second semi-fixed equalizing circuit 230, and the variable equalizing circuit 240 successively, and equalization processing of waveform distortion is performed. And, correction of a bit error and decoding processing are performed on the signal by the error correction/decoding circuit 260.

The first semi-fixed equalizing circuit 220 performs skew compensation and level adjustment and the like on the digital signal outputted from the coherent optical receiving unit 210. In other words, it compensates a skew which is a time delay in four mixed light caused by the characteristics of the 90 degrees optical hybrid 211, variation in the gain, and a difference from the optimum level which could not be absorbed by a gain adjustment before A/D conversion. Thus, the first semi-fixed equalizing circuit 220 is an equalizing circuit which mainly compensates the distortion caused by the characteristics of the units composing the coherent optical receiving unit 210 and the like before equalizing waveform distortion caused by optical transmission.

Also, the first semi-fixed equalizing circuit 220 is further provided with the configuration which performs chromatic dispersion compensation in the predetermined range.

The second semi-fixed equalizing circuit 230 compensates chromatic dispersion caused by optical transmission. As will become apparent below, the second semi-fixed equalizing circuit 230 converts the input signal in time domain into a frequency domain signal by the Fast Fourier Transform (FFT), and compensates chromatic dispersion by the frequency domain compensation. And then, it returns the frequency domain signal to the original signal in the time domain by the Inverse Fast Fourier Transform (IFFT).

As shown in FIG. 3, the second semi-fixed equalizing circuit 230 is provided with switch units at the input side and the output side. As will become apparent below, the second semi-fixed equalizing circuit 230 is stopped if the waveform equalization by the second semi-fixed equalizing circuit 230 is unnecessary because the chromatic dispersion amount to be compensated is small. This is performed in order to make the signal pass through by bypassing the second semi-fixed equalizing circuit 230 when it is stopped.

The variable equalizing circuit 240 compensates by means of the adaptive equalization the waveform distortion such as polarization mode dispersion which has remained in the second semi-fixed equalizing circuit 230.

The error correction/decoding circuit 260 corrects a bit error of the digital signal on which waveform equalization has been performed, demodulates a modulated multilevel signal, and outputs a reception signal.

The controller 250 distinguishes a chromatic dispersion amount to be compensated, and, depending on the chromatic dispersion amount, it controls the chromatic dispersion compensation process by using the first semi-fixed equalizing circuit 220 and the chromatic dispersion compensation process by using the second semi-fixed equalizing circuit 230.

Here, the word of "semi-fixed" in the first semi-fixed equalizing circuit 220 and the second semi-fixed equalizing circuit 230 is just named in order to indicate distinctively its slow variable speed compared with the speed of a circuit for adaptively equalizing process such as the variable equalizing circuit 240.

Next, the configuration of the first semi-fixed equalizing circuit 220, the second semi-fixed equalizing circuit 230, and the controller 250, which is the feature of the present exemplary embodiment, will be described, respectively.

Figure 4:
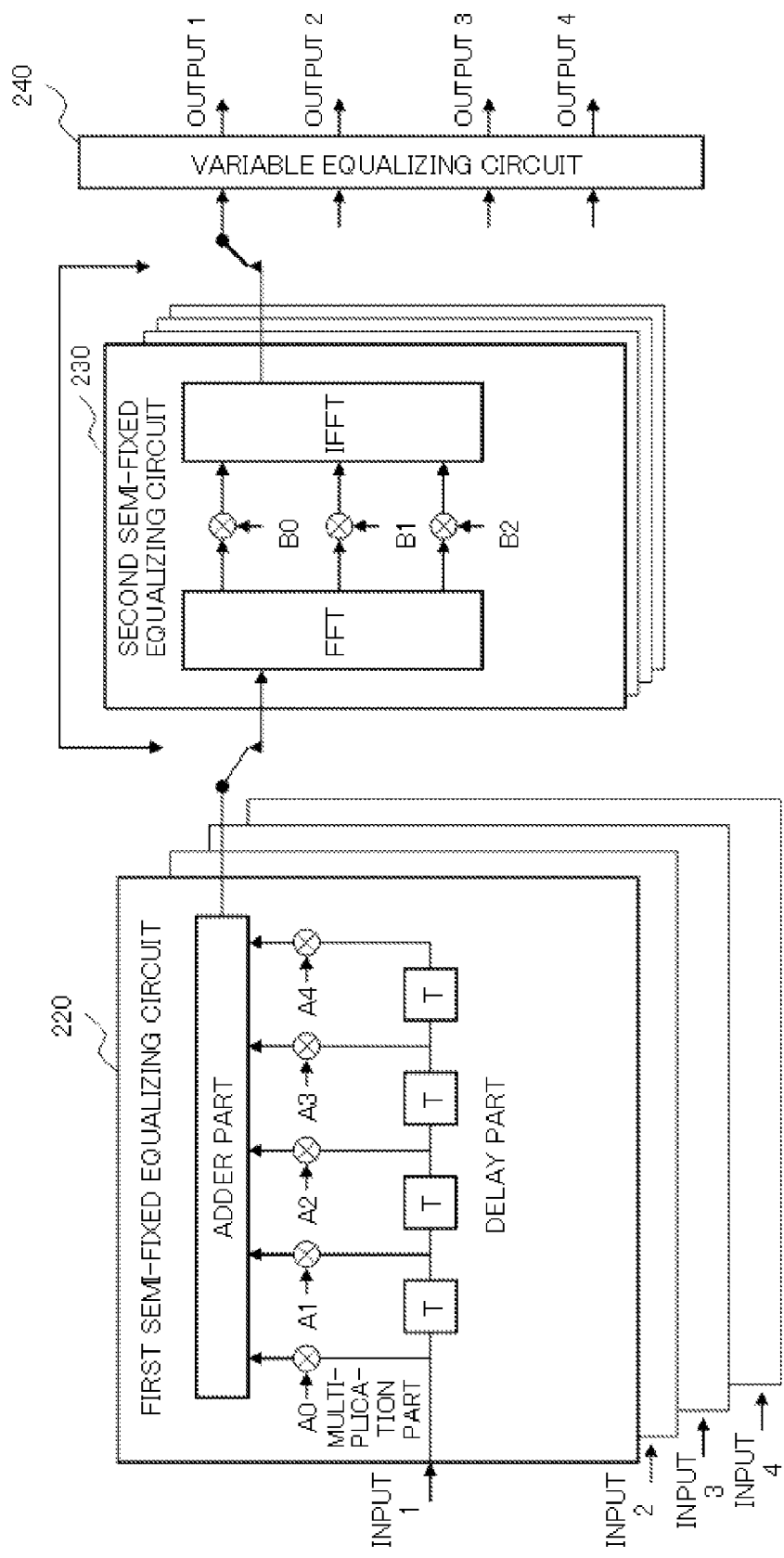
FIG. 4 is a block diagram showing a example configuration of a first semi-fixed equalizing circuit and a second semi-fixed equalizing circuit in the coherent optical receiver according to the second exemplary embodiment of the present invention.

FIG. 4 is a block diagram showing an example of the configuration of the first semi-fixed equalizing circuit 220 and the second semi-fixed equalizing circuit 230.

In the first semi-fixed equalizing circuit 220, an FIR (Finite Impulse Response) filter is employed for waveform equalization as a time domain equalizing filter. The FIR filter includes a delay part T, a multiplication part by a complex multiplier, and an adder part by a complex adder. Each of the signals tapped at the front and back delay part T is complex-multiplied by the time domain equalizing filter coefficient (the tap coefficient) A0-A4 for each tap in each complex multiplier. And then, the sum total of each complex-multiplied value is calculated in the adder part, and the results are outputted as the signal that the digital filtering process has been performed on the input signal using A0-A4 as the coefficient. The number of taps indicated here is an example and is not limited to this.

The first semi-fixed equalizing circuit 220 performs skew compensation and level adjustment and the like, which are the compensation for distortion caused by the characteristics of the coherent optical receiving unit 210, on the input signal by setting these tap coefficients A0-A4 for the appropriate value, and outputs the results. Furthermore, by setting these tap coefficients A0-A4 so that chromatic dispersion compensation can be performed simultaneously, the first semi-fixed equalizing circuit 220 is enabled to perform chromatic dispersion compensation at the same time as skew compensation and level adjustment and the like.

The following configuration is illustrated as such first semi-fixed equalizing circuit 220.

The first semi-fixed equalizing circuit 220 memorizes in advance the tap coefficients necessary for performing the skew compensation and level adjustment and the like, and normally performs the skew compensation and level adjustment and the like based on these tap coefficients. On the other hand, the first semi-fixed equalizing circuit 220 receives an instruction from the controller 250 if the chromatic dispersion compensation is performed in it. The instruction includes the dispersion compensation coefficient corresponding to the chromatic dispersion compensation amount that should be performed in the first semi-fixed equalizing circuit 220. And, the first semi-fixed equalizing circuit 220 calculates the tap coefficients, which are necessary to perform the chromatic dispersion compensation at the same time as the skew compensation and level adjustment and the like, on the basis of the tap coefficients for skew compensation and level adjustment and the like, and the dispersion compensation coefficient instructed by the controller 250.

In other words, the first semi-fixed equalizing circuit 220 performs the skew compensation and level adjustment and the like based on the tap coefficients stored in advance without an instruction from the controller 250. If the implementation of chromatic dispersion compensation is instructed from the controller 250, the first semi-fixed equalizing circuit 220 calculates the tap coefficients necessary to perform the chromatic dispersion compensation at the same time as the skew compensation and level adjustment and the like, and performs the chromatic dispersion compensation at the same time as the skew compensation and level adjustment and the like based on those calculated tap coefficients.

The second semi-fixed equalizing circuit 230 is an equalizing circuit whose main purpose is to perform chromatic dispersion compensation, and it uses a frequency domain equalizing filter which can realize the characteristics equivalent to those of a multistage FIR filter by means of relatively small circuit size. The frequency domain equalizing filter includes a Fast Fourier Transform part (FFT), a complex multiplication part, and an Inverse Fast Fourier Transform part (IFFT). The input signal in time domain is converted into a frequency domain signal by the Fast Fourier transform (FFT). The appropriate tap coefficients B0-B2 are given to the frequency domain signal in the complex multiplication part, and the frequency domain signal is obtained which has been processed for waveform equalization. The frequency domain signal which has been processed for waveform equalization is converted into the original time domain signal by the Inverse Fast Fourier transform part (IFFT) and the results are outputted. The number of taps indicated here is an example and is not limited to this.

Thus, chromatic dispersion compensation is mainly performed in the second semi-fixed equalizing circuit 230, and the first semi-fixed equalizing circuit 220 is configured to perform also chromatic dispersion compensation at the same time as performing skew compensation and level adjustment and the like.

Next, the operation of the coherent optical receiver 200 in the second exemplary embodiment configured like that will be described with reference to FIG. 3 and FIG. 5.

Here, the chromatic dispersion compensation amount that can be performed by the first semi-fixed equalizing circuit 220 and the second semi-fixed equalizing circuit 230 is assumed as follows for purpose of illustration.

That is, it is assumed that the first semi-fixed equalizing circuit 220 enables the amount of the chromatic dispersion compensation to be equal to 900 ps/nm at most, and the second semi-fixed equalizing circuit 230 enables the amount of the chromatic dispersion compensation to be equal to 20,000 ps/nm at most.

Referring to FIG. 3, the controller 250 includes a chromatic dispersion detection circuit 251 and a control circuit 252.

The chromatic dispersion detection circuit 251 is connected to the output side of the second semi-fixed equalizing circuit 230 and detects the chromatic dispersion amount that is included in the signal outputted from the second semi-fixed equalizing circuit 230. In the second semi-fixed equalizing circuit 230, the switch unit is set so that a signal can pass through the inside of the second semi-fixed equalizing circuit 230.

The control circuit 252 is notified of the chromatic dispersion amount detected by the chromatic dispersion detection circuit 251. The control circuit 252 controls the first semi-fixed equalizing circuit 220 and the second semi-fixed equalizing circuit 230 depending on the chromatic dispersion amount notified from the chromatic dispersion detection circuit 251.

Figure 5:
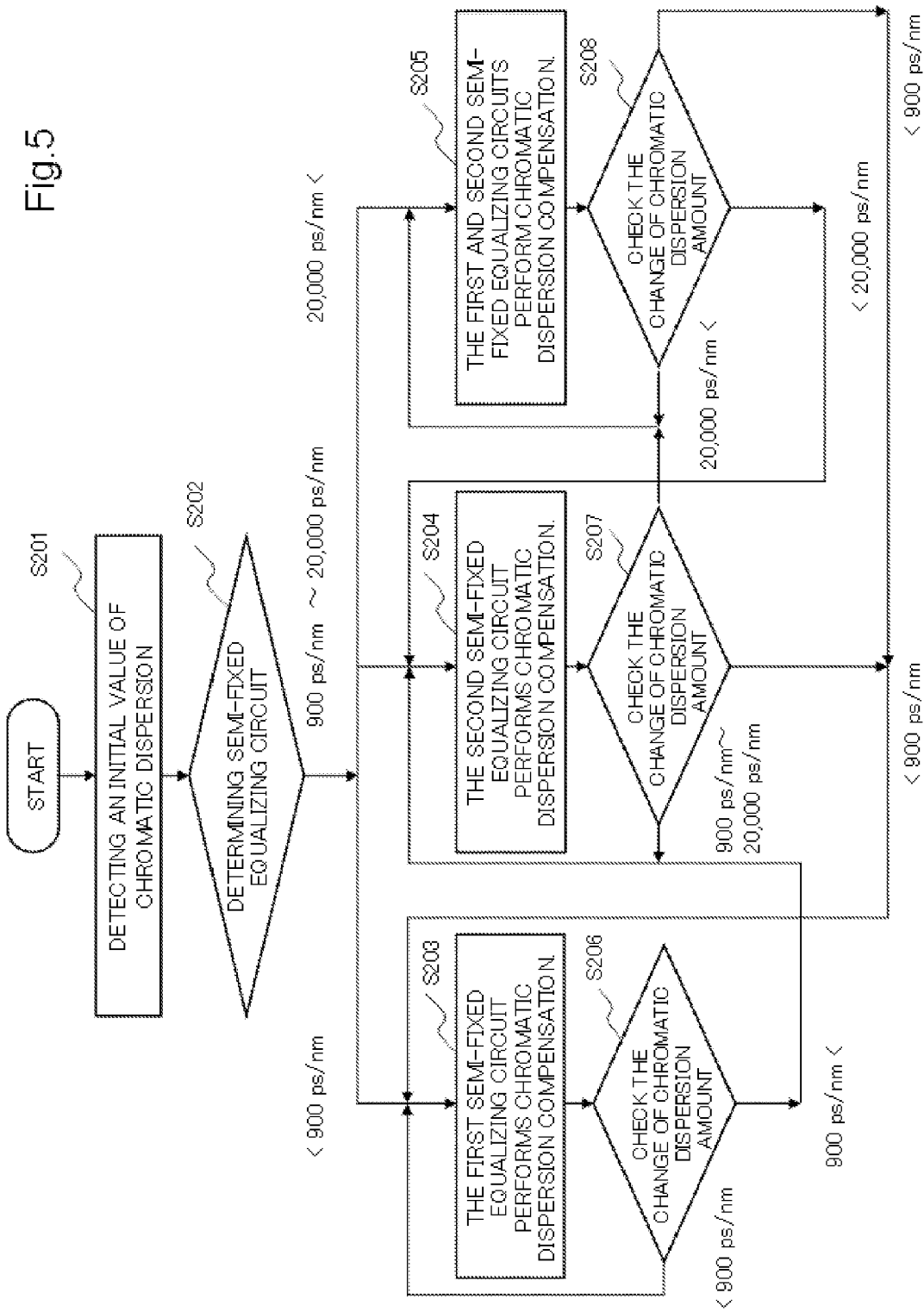
FIG. 5 is a flowchart illustrating the operation of a controller of the coherent optical receiver according to the second exemplary embodiment of the present invention.

FIG. 5 is a flowchart illustrating the operation of the controller 250.

As mentioned above, the chromatic dispersion detection circuit 251 detects the chromatic dispersion amount that is included in the signal outputted from the second semi-fixed equalizing circuit 230. First, the chromatic dispersion detection circuit 251 detects an initial value of a chromatic dispersion amount before the compensation operation is performed (S201).

The control circuit 252 determines a semi-fixed equalizing circuit to be used for chromatic dispersion compensation depending on this initial value of the chromatic dispersion amount (S202).

For example, if the initial value of the chromatic dispersion amount is less than 900 ps/nm, since it can be compensated by the first semi-fixed equalizing circuit 220, the control circuit 252 determines that the first semi-fixed equalizing circuit 220 performs the chromatic dispersion compensation (S203). In this case, the control circuit 252 does not work the second semi-fixed equalizing circuit 230 since it is not needed. And, the control circuit 252 sets the switch unit so that the signal can bypass the second semi-fixed equalizing circuit 230. The control circuit 252 also notifies the first semi-fixed equalizing circuit 220 of the dispersion compensation coefficient necessary to perform chromatic dispersion compensation in the first semi-fixed equalizing circuit 220. This is the calculated value based on the chromatic dispersion amount detected by the chromatic dispersion detection circuit 251.

By controlling like this, as described with reference to FIG. 4, the first semi-fixed equalizing circuit 220 performs chromatic dispersion compensation at the same time as skew compensation and level adjustment and the like which are the compensation of distortion caused by the characteristics of the coherent optical receiving unit 210.

If the initial value of the chromatic dispersion amount is equal to or more than 900 ps/nm and less than 20,000 ps/nm, it can be compensated by the second semi-fixed equalizing circuit 230. Therefore, the control circuit 252 determines that the second semi-fixed equalizing circuit 230 performs the chromatic dispersion compensation (S204). In this case, since it is unnecessary to perform chromatic dispersion compensation in the first semi-fixed equalizing circuit 230, the control circuit 252 does not notify the first semi-fixed equalizing circuit 220 of its dispersion compensation coefficient. And, the control circuit 252 sets the switch unit so that the signal can pass through the inside of the second semi-fixed equalizing circuit 230. The control circuit 252 also notifies the second semi-fixed equalizing circuit 230 of the dispersion compensation coefficient necessary to perform the chromatic dispersion compensation in the second semi-fixed equalizing circuit 230. This is the calculated value based on the chromatic dispersion amount detected by the chromatic dispersion detection circuit 251.

By controlling like this, the first semi-fixed equalizing circuit 220 performs only skew compensation and level adjustment and the like which are the compensation of distortion caused by the characteristics of the coherent optical receiving unit 210, and the chromatic dispersion compensation is performed in the second semi-fixed equalizing circuit 230.

If the initial value of the chromatic dispersion amount exceeds 20,000 ps/nm, the control circuit 252 determines that the first semi-fixed equalizing circuit 220 is also used to perform the chromatic dispersion compensation in addition to the second semi-fixed equalizing circuit 230 (S205).

For example, if chromatic dispersion compensation of 20,500 ps/nm is needed, the control circuit 252 controls the first and second semi-fixed equalizing circuit so that the first semi-fixed equalizing circuit 220 will compensate 500 ps/nm and the second semi-fixed equalizing circuit will compensate 23020,000 ps/nm. In this case, the control circuit 252 notifies the first semi-fixed equalizing circuit 220 of the dispersion compensation coefficient necessary to compensate chromatic dispersion of 500 ps/nm. The control circuit 252 also notifies the second semi-fixed equalizing circuit 230 of the dispersion compensation coefficient necessary to compensate chromatic dispersion of 20,000 ps/nm. And, the control circuit 252 sets the switch unit so that the signal can pass through the inside of the second semi-fixed equalizing circuit 230.

By controlling like this, the first semi-fixed equalizing circuit 220 performs the chromatic dispersion compensation of 500 ps/nm at the same time as skew compensation and level adjustment and the like which are the compensation of distortion caused by the characteristics of the coherent optical receiving unit 210. And, the second semi-fixed equalizing circuit 230 performs the remaining chromatic dispersion compensation of 20,000 ps/nm.

Next, under the circumstances where chromatic dispersion compensation based on the chromatic dispersion amount at the initial state mentioned above is performed, the control operation will be described when the chromatic dispersion amount detected by the chromatic dispersion detection circuit 251 has changed.

First, the operation will be described under the circumstances where the first semi-fixed equalizing circuit 220 performs chromatic dispersion compensation in Step S203 shown in FIG. 5.

The chromatic dispersion detection circuit 251 detects the chromatic dispersion amount included in the signal at the output side of the second semi-fixed equalizing circuit 230 and notifies the control circuit 252 about it. In this case, as described above, the switch unit is set so that the signal can bypass the second semi-fixed equalizing circuit 230 since the second semi-fixed equalizing circuit 230 is not used.

The control circuit 252 checks whether or not the change arises in the chromatic dispersion amount notified from the chromatic dispersion detection circuit 251 (S206). Although the chromatic dispersion amount has changed, if it is less than 900 ps/nm, the chromatic dispersion compensation is continued by the first semi-fixed equalizing circuit 220.

However, if the chromatic dispersion amount has changed and exceeds 900 ps/nm, since it cannot be handled by the first semi-fixed equalizing circuit 220, the control circuit 252 controls the first and second semi-fixed equalizing circuit so that the second semi-fixed equalizing circuit 230 can perform the chromatic dispersion compensation. In other words, the control circuit 252 makes work the second semi-fixed equalizing circuit 230 which has been stopped and changes the setting of the switch unit so that a signal can pass through the inside of the second semi-fixed equalizing circuit 230. And, the control circuit 252 notifies the second semi-fixed equalizing circuit 230 of the dispersion compensation coefficient that is calculated based on the chromatic dispersion amount detected by the chromatic dispersion detection circuit 251. At the same time, the notification of the dispersion compensation coefficient to the first semi-fixed equalizing circuit 220 is stopped.

Next, the operation will be described under the circumstances where the second semi-fixed equalizing circuit 220 performs chromatic dispersion compensation in Step S204 shown in FIG. 5.

The chromatic dispersion detection circuit 251 detects the chromatic dispersion amount included in the signal at the output side of the second semi-fixed equalizing circuit 230 and notifies the control circuit 252 about it. And, the control circuit 252 checks whether or not the change arises in the chromatic dispersion amount notified from the chromatic dispersion detection circuit 251 (S207).

Although the chromatic dispersion amount has changed, if it is equal to or more than 900 ps/nm and less than 20,000 ps/nm, the chromatic dispersion compensation is continued by the second semi-fixed equalizing circuit 230.

Here, when the chromatic dispersion amount has changed toward the decreased direction and it has become less than 900 ps/nm, the control circuit 252 stops the operation of the second semi-fixed equalizing circuit 230 and controls the first semi-fixed equalizing circuit 220 so that it can perform the chromatic dispersion compensation. The control circuit 252 notifies the first semi-fixed equalizing circuit 220 of the dispersion compensation coefficient that is calculated based on the chromatic dispersion amount detected by the chromatic dispersion detection circuit 251. As a result, as described above, the first semi-fixed equalizing circuit 220 operates so that it can perform chromatic dispersion compensation at the same time as skew compensation and level adjustment and the like which are the compensation of distortion caused by the characteristics of the coherent optical receiving unit 210. On the other hand, the control circuit 252 stops the operation of the second semi-fixed equalizing circuit 230 and changes the setting of the switch unit so that the signal can bypass the second semi-fixed equalizing circuit 230.

In contrast, if the chromatic dispersion amount has changed toward the increased direction and the chromatic dispersion amount has exceeded 20,000 ps/nm, the control circuit 252 controls the semi-fixed equalizing circuits so that the chromatic dispersion compensation can be performed by also using the first semi-fixed equalizing circuit 220 in addition to the second semi-fixed equalizing circuit 230. In this case, the control circuit 252 notifies the first semi-fixed equalizing circuit 220 of the dispersion compensation coefficient necessary to compensate chromatic dispersion with sharing.

Next, the operation will be described under the circumstances where the first semi-fixed equalizing circuit 220 and the second semi-fixed equalizing circuit 230 perform chromatic dispersion compensation in Step S205 shown in FIG. 5.

The chromatic dispersion detection circuit 251 detects the chromatic dispersion amount included in the signal at the output side of the second semi-fixed equalizing circuit 230 and notifies the control circuit 252 about it. And, the control circuit 252 checks whether or not the change arises in the chromatic dispersion amount notified from the chromatic dispersion detection circuit 251 (S208).

Although the chromatic dispersion amount has changed, if it still exceeds 20,000 ps/nm, the chromatic dispersion compensation is continued by the first semi-fixed equalizing circuit 220 and the second semi-fixed equalizing circuit 230.

On the other hand, if the chromatic dispersion amount has decreased and it becomes less than 20,000 ps/nm, since it can be handled by the chromatic dispersion compensation by the second semi-fixed equalizing circuit 230, the control circuit 252 stops notifying the first semi-fixed equalizing circuit 220 of the dispersion compensation coefficient that the first semi-fixed equalizing circuit 220 has processed with sharing. At that time, if the chromatic dispersion amount has rapidly decreased and it becomes less than 900 ps/nm, the control circuit 252 may stop the chromatic dispersion compensation by the second semi-fixed equalizing circuit 230 and continue to perform the chromatic dispersion compensation by the first semi-fixed equalizing circuit 220.

In this exemplary embodiment, although it has been described that the chromatic dispersion detection circuit 251 is connected to the output side of the second semi-fixed equalizing circuit 230, it may be connected to the output side of the first semi-fixed equalizing circuit 220. Alternatively, the chromatic dispersion detection circuit 251 may be configured to perform the feed forward control by connecting it to the input side of the first semi-fixed equalizing circuit 220.

As described above, the coherent optical receiver 200 performs chromatic dispersion compensation by combining the first semi-fixed equalizing circuit 220 and the second semi-fixed equalizing circuit 230 appropriately by the control circuit 252 depending on the chromatic dispersion amount detected by the chromatic dispersion detection circuit 251. Therefore, the chromatic dispersion compensation can be flexibly performed even under the environment where the chromatic dispersion amount to be compensated is greatly different. That is to say, the chromatic dispersion compensation can be flexibly performed in such a manner as the compensation handled only by the first semi-fixed equalizing circuit 220, the compensation handled only by the second semi-fixed equalizing circuit 230, and the compensation handled by both of the first semi-fixed equalizing circuit 220 and the second semi-fixed equalizing circuit 230. Alternatively, if the chromatic dispersion compensation is performed only by the first semi-fixed equalizing circuit 220, the power consumption can be reduced by stopping the second semi-fixed equalizing circuit 230.

Moreover, since the first semi-fixed equalizing circuit 220 shares in the chromatic dispersion compensation in the predetermined range, the second semi-fixed equalizing circuit 230 can be realized by a smaller circuit size by sharing. Furthermore, since the first semi-fixed equalizing circuit 220 is originally provided in order to perform the skew compensation and level adjustment of an input signal which are the compensation of distortion caused by the characteristics of the coherent optical receiving unit 210, it does not need to set up it additionally as a new circuit configuration.

Generally, the digital signal processing unit in the coherent optical receiver corrects the dispersion and phase rotation, which arise due to the signal light transmitting in the optical fiber, and corrects a frequency offset caused by the frequency difference between the signal light and the local oscillation light. And, the digital signal processing unit includes a discrimination and demodulation circuit which demodulates the corrected signal into its original signal. For example, in FIG. 1 of Japanese Patent Application Laid-Open Publication No. 2011-015013, a digital signal processing unit is shown which includes a waveform distortion compensating circuit, a carrier frequency-phase synchronization circuit, and a discrimination and demodulation circuit. And, in FIG. 3 of the Japanese Patent Application Laid-Open Publication No. 2011-015013, waveform distortion compensating circuits are shown such as a chromatic dispersion circuit for compensating chromatic dispersion and an adaptive equalization type waveform distortion compensating circuit for compensating polarization mode dispersion and the like.

Here, attention is paid to a compensating circuit which compensates waveform distortion of a reception signal, especially chromatic dispersion. Circuit configurations are employed such as a circuit using the FIR (Finite Impulse Response) filter shown in FIG. 4 of the Japanese Patent Application Laid-Open Publication No. 2011-015013 and a circuit for compensating it in the frequency domain using the Fast Fourier Transform shown in FIG. 5 of the Japanese Patent Application Laid-Open Publication No. 2011-015013, for example.

Such electric equalizing filters need a large-scale circuit in order to compensate large chromatic dispersion. For example, in a case of transmitting a light signal more than 2,000 km through a single-mode fiber, the chromatic dispersion amount comes close to 40,000 ps/nm. If this chromatic dispersion is compensated by using the FIR filter, for example, the number of taps becomes approximately more than some hundreds which are necessary for the signal transmitted by the transmission rate of 100 Gbps. Alternatively, if the chromatic dispersion is compensated in the frequency domain by using the Fast Fourier Transform, a large-scale circuit is needed similarly. Thus, in the electric equalizing filter for compensating chromatic dispersion, its circuit scale becomes larger depending on the chromatic dispersion amount to be compensated, and moreover, its power consumption also becomes larger.

Even in such a case, there is no problem if a transmission path is fixed. However, in the mesh network where a plurality of nodes can be connected in the mesh configuration and an arbitrary transmission path between arbitrary nodes can be selected, the chromatic dispersion amount to be compensated is different depending on the selected route. Therefore, it is wasteful to use a dispersion compensation circuit with a large circuit size regardless of the size of the chromatic dispersion amount, and the power consumption cannot be reduced depending on the chromatic dispersion amount to be compensated.

The Japanese Patent Application Laid-Open Publication No. 2011-009956 and the Japanese Patent Application Laid-Open Publication No. 2011-015013 described above does not disclose at all that the circuit scale is changed and the power consumption is reduced depending on the chromatic dispersion amount to be compensated.

According to the technology disclosed in the Japanese Patent Application Laid-Open Publication No. 2010-178222, the compensation is performed by appropriately combining a plurality of regulated amount compensation units in which the compensation amount is fixed and the variable compensation unit which compensates it with a variable compensation amount depending on the chromatic dispersion amount to be compensated. Therefore, the circuit size of the regulated amount compensation unit in which the compensation amount is fixed can be surely made smaller. Furthermore, since the compensation amount by the variable compensation unit can be reduced by the amount compensated by the regulated amount compensation unit, the circuit size of the variable compensation unit can be also made smaller.

However, it is difficult to configure a well-balanced circuit by the technology disclosed in the Japanese Patent Application Laid-Open Publication No. 2010-178222, if the technology is applied to the environment where the chromatic dispersion amount to be compensated is greatly different from smaller one to largeer one. In other words, in the technology disclosed by the Japanese Patent Application Laid-Open Publication No. 2010-178222, the size of the fixed compensation amount compensated by the regulated amount compensation unit, the number of the regulated amount compensation units to be implemented, and the variable compensation amount possibly handled by the variable compensation unit are determined on the premise of the use in the environment where the chromatic dispersion amount to be compensated falls in a certain measurable range. Therefore, in the environment compensating the chromatic dispersion amount smaller than the assumed range, a plurality of the regulated amount compensation units in which the compensation amount is fixed can be configured wastefully.

An exemplary advantage according to the present invention is that in a coherent optical receiver of an optical fiber transmission system, the chromatic dispersion compensation can be performed flexibly by a small circuit size even in the environment where the chromatic dispersion amount to be compensated is greatly different.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A coherent optical receiver, comprising:
a coherent optical receiving unit;
a first waveform equalizing circuit compensating waveform distortion caused by characteristics of the coherent optical receiving unit and compensating chromatic dispersion in a predetermined range to an input signal with a variable compensation amount:
a second waveform equalizing circuit compensating chromatic dispersion of the input signal with a variable compensation amount; and
a controller monitoring a chromatic dispersion amount of the input signal and controlling a compensation coefficient regarding the chromatic dispersion compensation performed by each of the first waveform equalizing circuit and the second waveform equalizing circuit depending on the chromatic dispersion amount to be compensated.

2. The coherent optical receiver according to claim 1, wherein if the chromatic dispersion amount to be compensated is in a predetermined range and is equal to the chromatic dispersion amount that can be handled by the first waveform equalizing circuit, the controller stops operation of the second waveform equalizing circuit and makes the first waveform equalizing circuit perform chromatic dispersion compensation in addition to compensation of waveform distortion caused by the characteristics of the coherent optical receiving unit.

3. The coherent optical receiver according to claim 1, wherein if the chromatic dispersion amount to be compensated exceeds the chromatic dispersion amount in the predetermined range that can be handled by the first waveform equalizing circuit, the controller makes the second waveform equalizing circuit perform chromatic dispersion compensation, and makes the first waveform equalizing circuit perform only compensation of waveform distortion caused by the characteristics of the coherent optical receiving unit.

4. The coherent optical receiver according to claim 1, wherein if the chromatic dispersion amount to be compensated exceeds the chromatic dispersion amount that can be handled by the second waveform equalizing circuit, the controller makes the second waveform equalizing circuit perform chromatic dispersion compensation, and makes the first waveform equalizing circuit perform chromatic dispersion compensation in addition to the compensation of waveform distortion caused by the characteristics of the coherent optical receiving unit.

5. The coherent optical receiver according to claim 4, wherein if the first waveform equalizing circuit receives notice of a first compensation coefficient required for the chromatic dispersion amount to be compensated from the controller, based on the first compensation coefficient and a second compensation coefficient required for the compensation of the waveform distortion caused by the characteristics of the coherent optical receiving unit, the first waveform equalizing circuit generates a third compensation coefficient which is required for performing chromatic dispersion compensation in the predetermined range in addition to the compensation of the waveform distortion caused by the characteristics of the coherent optical receiving unit.

6. A coherent optical receiver, comprising:
a coherent optical receiving means;
a first waveform equalizing means compensating waveform distortion caused by characteristics of the coherent optical receiving means and compensating chromatic dispersion in a predetermined range to an input signal with a variable compensation amount;
a second waveform equalizing means compensating chromatic dispersion of the input signal with a variable compensation amount; and
a control means monitoring a chromatic dispersion amount of the input signal and controlling a compensation coefficient regarding the chromatic dispersion compensation performed by each of the first waveform equalizing means and the second waveform equalizing means depending on the chromatic dispersion amount to be compensated.

7. A coherent optical receiving method, comprising:
compensating waveform distortion caused by coherent optical receiving and compensating chromatic dispersion in a predetermined range to an input signal with a variable compensation amount;
performing chromatic dispersion compensation to the input signal with a variable compensation amount; and
monitoring a chromatic dispersion amount of the input signal, and controlling a compensation coefficient regarding each of the chromatic dispersion compensation in a predetermined range and the chromatic dispersion compensation to the input signal depending on the chromatic dispersion amount to be compensated.

8. The coherent optical receiving method according to claim 7, further comprising:
if the chromatic dispersion amount to be compensated is equal to the chromatic dispersion amount that can be compensated by performing chromatic dispersion compensation in a predetermined range,
stopping chromatic dispersion compensation to the input signal; and
performing chromatic dispersion compensation in the predetermined range in addition to compensation of waveform distortion caused by the characteristics of the coherent optical receiving.

9. The coherent optical receiving method according to claim 7, further comprising:
if the chromatic dispersion amount to be compensated exceeds the chromatic dispersion amount that can be compensated by performing chromatic dispersion compensation of the input signal,
performing chromatic dispersion compensation to the input signal; and
performing chromatic dispersion compensation in the predetermined range in addition to the compensation of waveform distortion caused by the coherent optical receiving.

10. The coherent optical receiving method according to claim 9, further comprising:
calculating a first compensation coefficient required for the chromatic dispersion amount to be compensated; and
based on the first compensation coefficient and a second compensation coefficient required for the compensation of the waveform distortion caused by the coherent optical receiving, generating a third compensation coefficient required for performing chromatic dispersion compensation in the predetermined range in addition to the compensation of the waveform distortion caused by the coherent optical receiving.

* * * * *